(12) United States Patent
Schwarzmann (10) Patent No.: US 7,464,009 B2
(45) Date of Patent: Dec. 9, 2008

(54) SYSTEMS, METHODS, AND ARTICLES OF MANUFACTURE FOR FLEXIBLE PATH OPTIMIZATION

(75) Inventor: Winfried Schwarzmann, Rauenberg (DE)

(73) Assignee: SAP AG, Walldorf (DE)

( * ) Notice: Subject to any disclaimer, the term of this patent is extended or adjusted under 35 U.S.C. 154(b) by 653 days.

(21) Appl. No.: 11/025,053

(22) Filed: Dec. 30, 2004

(65) Prior Publication Data

US 2006/0015830 A1    Jan. 19, 2006

(30) Foreign Application Priority Data

Jul. 14, 2004    (EP) .................... 04016555

(51) Int. Cl.
*G06F 17/50* (2006.01)
*G01C 21/28* (2006.01)

(52) U.S. Cl. ............... 703/2; 703/17; 707/104; 701/210

(58) Field of Classification Search ............ 703/2, 703/17, 6; 701/210; 370/256; 707/104
See application file for complete search history.

(56) References Cited

U.S. PATENT DOCUMENTS

| | | | |
|---|---|---|---|
| 5,285,391 A | 2/1994 | Smith, Jr. et al. | |
| 5,521,910 A | 5/1996 | Matthews et al. | |
| 7,353,220 B2 | 4/2008 | Schwarzmann | |
| 2003/0014286 A1 | 1/2003 | Cappellini | |
| 2003/0172135 A1 | 9/2003 | Bobick et al. | |
| 2004/0103117 A1 | 5/2004 | Segler | |
| 2004/0249809 A1* | 12/2004 | Ramani et al. ............. | 707/4 |

(Continued)

FOREIGN PATENT DOCUMENTS

EP    1016963 A    7/2000

(Continued)

OTHER PUBLICATIONS

EPO Communication and Search Report, dated Mar. 30, 2005, 8 pages.

(Continued)

*Primary Examiner*—Thai Phan
(74) *Attorney, Agent, or Firm*—Finnegan, Henderson, Farabow, Garrett & Dunner LLP (57) ABSTRACT

A flexible transportation optimization approach is described that can easily be implemented on multi-tiered computer systems and that does not unnecessarily consume processing and memory resources. On a database tier a data model is defined. The data model comprises master data including a state set with a plurality of states representative of physical sites or conditions of a physical entity, wherein each state is assigned to exactly one hierarchy level and wherein to each state zero, one or a plurality of states of lower hierarchy levels are assigned and a transition set with transitions from one state to a state on the same or on a different hierarchy level. On an application tier, a processor performs for at least one given source state and at least one given destination state, repeatedly steps of generating a graph having a plurality of states as vertices, transitions and hierarchical relationships among states as edges, and a cost function, and of subjecting the graph to a path optimization mechanism outputting multiple paths from the at least one source state to the at least one destination state that heuristically influence the generation of the succeeding graph, wherein the one or more solution paths are included in the paths generated during the last repetition.

22 Claims, 7 Drawing Sheets

U.S. PATENT DOCUMENTS

2005/0261828 A1* 11/2005 Crowder et al. ............. 701/210
2006/0015848 A1 1/2006 Schwarzmann
2006/0020789 A1 1/2006 Gipps et al.

FOREIGN PATENT DOCUMENTS

WO WO 97/15003 A 4/1997
WO WO 02/054332 A 7/2002

OTHER PUBLICATIONS

Sungwon Jung et al., "HiTi Graph Model of Topographical Road Maps in Navigation Systems," Proceedings of the Twelfth International Conference, New Orleans, LA, IEEE Computer Society, Feb. 1996, pp. 76-84.

Michel Koskas, "A hierarchical Algorithm to Solve the Shortest Path Problem in Valued Graphs," Oct. 10, 2003, retrieved from the Internet: http://arxiv.org/PS_cache/cs/pdf/0310/0310019.pdf, pp. 1-19.

John Guzolek et al., "Real-Time Route Planning in Road Networks," Vehicle Navigation and Information Systems Conference, Toronto, CA, IEEE, 1989, pp. 165-169.

Jochen Behrens et al., "Hierarchical Routing Using Link Vectors," INFOCOM '98, Seventeenth Annual Joint Conference on the IEEE Comput. and Comm. Societies, San Francisco, CA, IEEE, 1998, pp. 702-710.

EPO Communication and Search Report for European Patent Application No. 04016604 (filed Jul. 14, 2004), dated Oct. 17, 2005 (12 pages).

Gamma et al., "Design Patterns: Elements of Reusable Object-Oriented Software," Addison-Wesley Professional Computing Series, 1995, Table of Contents and pp. 331-344.

* cited by examiner

SYSTEMS, METHODS, AND ARTICLES OF MANUFACTURE FOR FLEXIBLE PATH OPTIMIZATION

RELATED APPLICATIONS

This application claims the benefit of European Patent Application No. 04016555.7, filed Jul. 14, 2004, the content of which is expressly hereby incorporated by reference in its entirety.

BACKGROUND

1. Technical Field

The invention relates to the technical field of path optimization mechanisms. More specifically, the invention relates to aspects in context with a graph based approach for efficiently finding one or more solution paths between two states representative of physical sites or conditions of a physical entity.

2. Background Information

Data that can be represented in the form of a graph is processed in a variety of different contexts. As an example the generation of transportation models for computer-implemented processing tasks such as transportation path optimization can be mentioned.

Such transportation models help to solve problems relating to the transportation of tangible and intangible objects. Tangible objects such as fluids have to be transported via complex pipeline systems. Goods such as construction material require a transportation between remote geographical places across a network of ground, air and sea ways. Intangible objects like electrical signals have to be transported for example within the highly complex wiring system in an airplane. Other intangible objects such as information in the form of electronic mails is sent across the World Wide Web via a plurality of intermediary routers.

Due to their complexity, transportation problems are conventionally modeled and solved on computers using a graph-based approach. In computer science, a graph is an abstract data model that consists of vertices (also called nodes or, in the present context, states) connected via edges. The basic data model for transportation problems includes states in form of locations and zones (as vertices) and connecting transitions in form of lanes (as edges). A transition $E=(X, Y)$ is a (directed or not directed) link between a first state X and a second state Y. A sequence $E1, \ldots, En$ of connected transitions constitutes a path within the graph.

Transportation paths have to be planned taking into account prevailing transportation constraints. Besides the availability of transportation links, transportation hubs, etc., capacity constraints like number of vehicles, network bandwidth, pipeline diameter, etc. can play a role. Additionally, transportation assignments associating transportation means and transportation service providers (e.g. network service providers) exist. Basing the transportation paths determination, inter alia, on such transportation assignments aims at saving resources (such as the number of intermediary components involved in a particular transportation task, etc.).

When implemented in a computer system, the conventional data models for transportation optimization are not under all circumstances satisfactory. The transportation optimization is often carried out either solely on a detailed level or first on an aggregated and afterwards on a detailed level. Nevertheless, the transportation master data is often not structured to allow for a fast and smooth processing. In addition to master data on either aggregated level (utilized mainly to save memory consumption) or detailed level (utilized mainly to be precise or to state exceptions), one might think of defining master data striking several levels. In such a case the data would not need to be converted by the application before it can start the transportation optimization. This pre-processing step is, however, technically disadvantageous if the actual optimization is on average not comprehensive and/or the single requests for transportation paths cannot be gathered over a longer period of time (e.g., in a real-time environment). On the other hand, the conversion step may further complicate maintenance, as the optimization data does not directly reflect the master data on the database.

Accordingly, there is a need for a more flexible transportation optimization approach that can easily be implemented on multi-tiered (or other) computer systems and that does not unnecessarily consume processing and memory resources.

SUMMARY

According to a first aspect of the invention, a method for determining one or more solution paths between two states using a hierarchy graph that defines a sequence of hierarchy levels is provided. The method comprises the step of providing a data model of master data including a state set with a plurality of states (that may be representative of physical sites or conditions of a physical entity), wherein each state is assigned to exactly one hierarchy level and wherein to each state zero, one or a plurality of states of lower hierarchy levels are (directly or indirectly) assigned, and a transition set with transitions from one state to a state on the same or on a different hierarchy level. The method comprises the further step of repeatedly performing, for at least one given source state and at least one given destination state, the sub-steps of generating a graph having a plurality of states as vertices, transitions and hierarchical relationships among states as edges, and a cost function (also called penalty function) and of subjecting the graph to a path optimization mechanism outputting multiple paths from the at least one source state to the at least one destination state that heuristically influence the generation of the succeeding graph, wherein the one or more solution paths are included in the paths generated during the last repetition. One or more of the solution paths may be output to a requesting application and/or via a (graphical) user interface. In the transportation context, the method may further comprise the step of controlling transportation of information or tangible objects via a selected one of the solution paths.

During an individual repetition the graph may be built instantaneously or gradually. In many cases it is not necessary to built the whole graph, for example when it is determined that only a part of the graph is relevant for the path optimization request (that may specify at least one source state and at least one destination state).

The above approach introduces a hierarchical organization among the states (i.e., among the vertices of the graph) in addition to the graph organization given by the states and transitions. The edges of the graphs subjected to the path optimization mechanism are thus not only constituted by the transitions. Additional edges may result from the hierarchical relationships among the states. If, for example, a state on a higher hierarchy level is hierarchically linked (e.g., by some kind of a parent-child relationship) with a state on a lower hierarchy level, then such a link also constitutes an edge within the graph even if no transition between the states linked by this edge has been defined. The path optimization mechanism may thus calculate one or more paths that stretch over more than one hierarchy level. The edges representing hierarchical links allow the path optimization to switch from a more detailed to a more aggregated data level, and vice versa, in order to continue with transitions starting on the reached level (only). This renders path optimization more flexible.

The path optimization mechanism may repeatedly be performed for different levels, from a higher hierarchy level down to a lower hierarchy level (skipping intermediate hierarchy levels if wanted). The output of the path optimization mechanism on each level is one or more valid paths. On a higher hierarchy level the most promising outputted paths may heuristically be selected (based on previously defined heuristic rules), and only the selected paths may be considered further during the next repetition (that may be performed on a lower hierarchy level). This approach reduces the overall amount of calculations that need to be performed for finding one or more solution paths on a given (often the lowest defined) level. One reason for this is that on lower levels there often exists a large number of states, and restricting the number of considered states allows to significantly reduce the time for the corresponding path optimization.

As the transitions and the hierarchy relationships among individual paths exploited by the path optimization mechanism on an application level are already properly defined in the data model, the gap between a database tier and an application tier in a multi-tiered computer system may be reduced.

The path optimization mechanism may on each level dynamically be controlled by at least one of a optimization time limit and a maximum number of solution paths. As an example, the repetitive process may be aborted after a predefined period of time has elapsed and/or after a predefined number of solution paths has been found. Alternatively or additionally, a maximum number of considered levels may be defined, and the specific levels determined during run-time.

In one variation of the invention, the hierarchical relationship between two states is defined directly in the data model (e.g., by storing links indicative of parent-child relationships). In another variation, the hierarchical relationship between two states is defined indirectly through conditions on state attributes. If for example a state on a higher hierarchy level is associated with a range of coordinates or IP addresses, any state on a lower hierarchy level that is associated with a coordinate or an IP address included in the range is hierarchically related with the state on the higher hierarchy level (even if no explicit link is defined in the data model). The concepts of direct and indirect state hierarchy definition may be combined.

To each generated graph a single level of the sequence of hierarchy levels may be assigned. In one variation, the levels assigned to the repeatedly generated graphs are strictly descending, and in this way the termination of the entire method can be guaranteed.

The vertex set of each graph generated during the repetitions may include only states having a level less or equal to the level assigned to the respective graph. The edge set of each graph generated during the repetitions may include a subset of the transitions and hierarchical relationships between its states.

A sequence of edges is considered a path in one of the repeatedly generated graphs if all edges are in the edge set of this graph and if for each edge having a successor in the sequence its end and the start of its successor coincide. Each valid path in this graph starts at the at least one source state and ends at the at least one destination state. From an edge in one of the repeatedly generated graphs a set of edges in that graph which is built during the next repetition may be generated using the hierarchical relationships of its states. From a path in one of the repeatedly generated graphs a set of paths in the graph generated during the next repetition may be generated using the generated edge sets of its edges.

In one variation of the invention, the cost function of one of the repeatedly generated graphs may evaluate a path in this graph based on costs associated with the edges of this graph. In another embodiment, the cost function of one of the repeatedly generated graphs "looks ahead" and evaluates a path based on the evaluated costs of paths in its generated set of paths. Further, if a path is eventually selected (e.g., by the heuristic) to be considered in more detail on a lower level, then these generated graphs may be reused.

The master data may further include at least one dimension set including a plurality of dimensions. In this case the cost functions on the considered levels may be indicative of dimensions in the dimension set. In a transportation context, the dimensions may include one or more of the following measures: transportation duration, transportation capacity, transportation distance, and change of transportation means or transportation service provider.

Different types of transportation means may be associated with different transition types. A (further) hierarchical relationship may be defined among the types of transportation means.

Depending on the particular application, the states may relate to different physical and programming-specific entities. The states may for example include location objects (in an object-oriented sense) on a first hierarchy level and zone objects on a second hierarchy level above the first hierarchy level. To each zone object zero, one or more location objects may be assigned using appropriate definitions.

The heuristic character of the inventive method is fundamentally given if on various levels the paths determined by the path optimization mechanism influences the generation of the graph on the next level in the repetition. Further, not all paths returned by the path optimization mechanism may even be accepted (selected) by corresponding heuristics. These heuristic elements, and all others brought into the framework provided the inventive method, are to be seen as means to control the overall run-time of the entire method.

The invention may be practiced as a software solution, as a hardware solution or as a combination thereof. As regards a software solution, the invention relates to computer program product comprising program code portions for performing the steps of the invention when the computer program product is run on one or more computer network components or computer systems. The computer program product may be stored on a computer readable recording medium.

As regards a hardware solution, a computer system for heuristically finding one or more solution paths between two states using a hierarchy graph that defines a sequence of hierarchy levels is provided. The computer system comprises a database providing a data model of master data including a state set with a plurality of states (that may be representative of physical sites or conditions of a physical entity), wherein each state is assigned to exactly one hierarchy level and wherein to each state zero, one or a plurality of states of lower hierarchy levels are assigned, and a transition set with transitions from one state to a state on the same or on a different hierarchy level. The computer system further comprises a processor which for at least one given source state and at least one given destination state repeatedly generates a graph having a plurality of states as vertices, transitions and hierarchical relationships among states as edges, and a cost function, and subjects the graph to a path optimization mechanism outputting multiple paths from the at least one source state to the at least one destination state that heuristically influence the generation of the succeeding graph, wherein the one or more solution paths are included in the paths generated during the last repetition.

The computer system may be implemented as a single-tier system. It may alternatively be configured as a multi-tier system including, for example, a database tier (or database layer) and an application tier (or application layer).

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described herein.

BRIEF DESCRIPTION OF THE DRAWINGS

The accompanying drawings are incorporated in and constitute a part of this specification and, together with the description, explain the principles of the invention. In the drawings.

DETAILED DESCRIPTION

In the following description, for purposes of explanation and not limitation, specific details are set forth, such as particular data models and processes utilized in connection therewith in order to provide a thorough understanding of the present invention. It will be apparent to one skilled in the art that the present invention may be practiced in other embodiments that depart from these specific details.

In particular, while the different embodiments described herein below are incorporated into or used in conjunction with particular types of data storage, data representation, and hierarchical functionalities, it will be appreciated by the skilled artisan that the present invention is applicable to a wide variety of data storage types, data representation mechanisms, and hierarchical functionalities. Although the invention will be illustrated using embodiments relating to transportation models, the invention is not restricted to processing data in a transportation context.

Hereinafter, the invention will exemplarily be described with respect to a client/server computing approach. The invention is, however, not limited to such a computing approach. Where appropriate, the same reference numbers will be used throughout this detailed description in conjunction with the drawings to refer to the same or like parts.

One possible configuration in which the present invention can be carried out is the so-called three-tiered architecture, which separates a network system's components into three functional groups: presentation, application, and database. This is illustrated in FIG. 1 in a hardware-related view.

Figure 1:
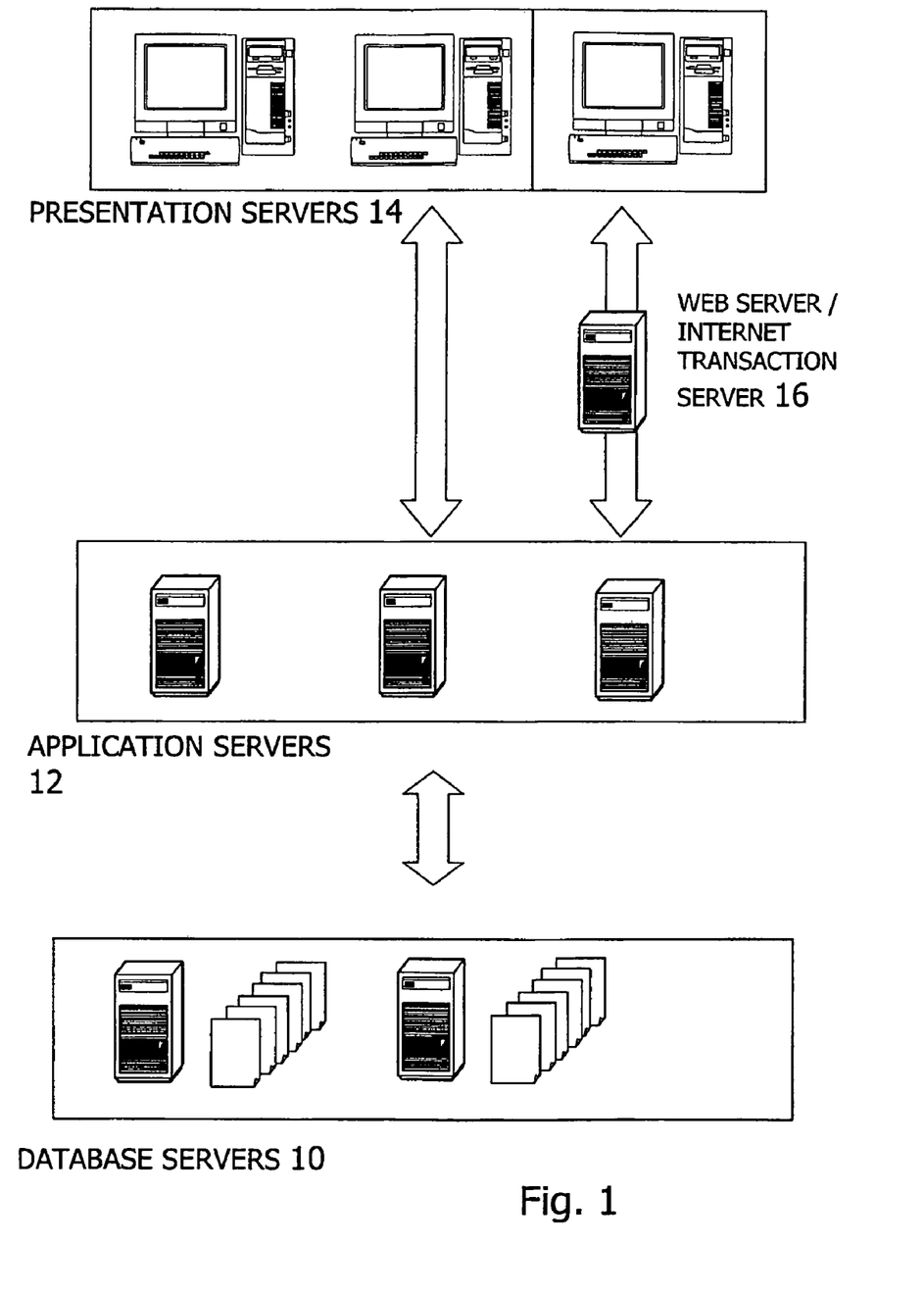
FIG. 1 is a schematic diagram illustrating a hardware-oriented view of a three-tiered client/server configuration in which the invention can be practiced.

With the three-tiered architecture shown in FIG. 1, each hardware group is configured to support demands of its functions. One or more database servers 10 on a bottom layer contain system databases. Application servers 12 on an intermediate layer interfacing the database servers 10 include the processing logic of the system with services such as spooling, dispatching user requests, and formatting data. The tasks related to data presentation are handled on a top layer by presentation servers 14, which are typically personal computers or workstations, enabling easy access to the system. External presentation servers 14 may be connected to the application servers 12 via the Internet and a Web server/Internet transaction server 16. Communication among the three tiers can be accomplished with the use of standard protocol services, such as the ones provided by TCP/IP or CPIC. CPIC stands for Common Programming Interface Communication and includes standard functions and services for program-to-program communication.

Figure 2:
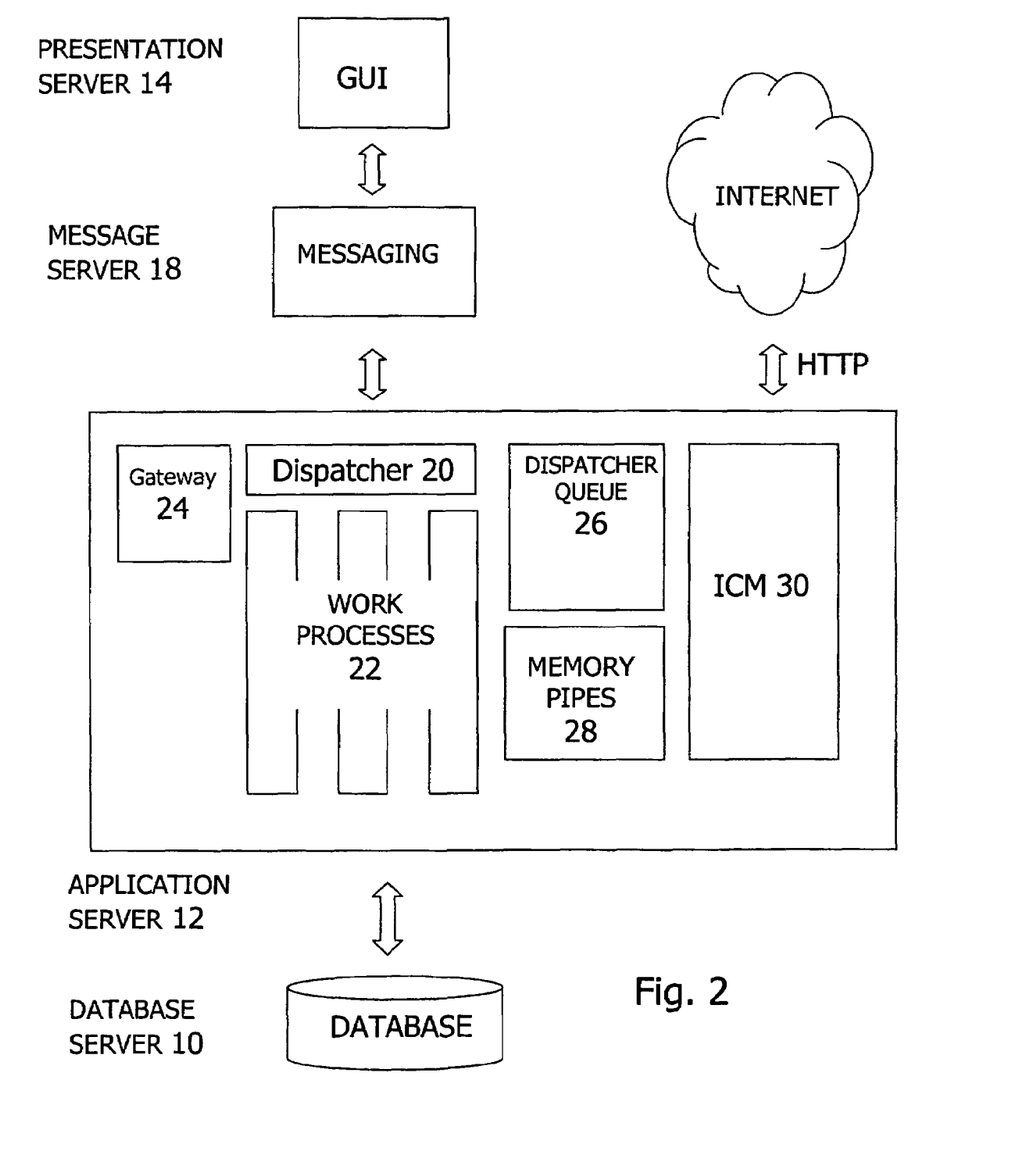
FIG. 2 is a schematic diagram illustrating a software-oriented view of a three-tiered client/server configuration of FIG. 1.

The three-tiered hardware architecture that is depicted in FIG. 1 is shown in FIG. 2 in a software-related view. As becomes apparent from FIG. 2, the software components used in context with the present invention include a graphical user interface (GUI) installed on each presentation server 14 of FIG. 1, an application component (or simply application) that runs on the application server 12 and a database component installed on database servers 10. The application component has interfaces to the database component, to the Internet and, via a messaging component installed on a message server 18, to the GUI. The message server 18 is a service used by different application servers 12 to exchange data and internal messages. The main tasks of the message server 18 include the transfer of messages and the distribution of workload between individual application servers 12.

The application running on the application server 12 includes a dispatcher 18 interfacing the message server 18 and one or more presentation servers 14 on the one hand and a plurality of parallel work processes 22 on the other hand. Each work process 22 has an interface to the database on the database server 10.

Furthermore, a gateway 24 is provided that may either be installed, from a hardware point of view, on the application server 12 or on a dedicated gateway server (not shown). The gateway service provided by the gateway 24 allows for a communication between different applications using the CPIC protocol. The function of the gateway 24 is to exchange large amounts of data between application servers, in contrast to the message server 18, which only exchanges brief internal and control messages. The application component depicted in FIG. 3 further includes dispatcher queues 26, memory pipes 28 and an Internet Communication Manager (ICM) 30, interfacing the Internet.

In the following the interrelation and cooperation among the individual software components depicted in FIG. 2 will be described in more detail.

As data is entered in the presentation server 14 (or otherwise generated), the data is received by the GUI, converted to a standard format, and sent via the messaging server 18 to the dispatcher 20. The connection between the GUI on the presentation server 14 and the dispatcher 20 is made with a protocol like DIAG, according to which small data packages are sent through the connecting network.

The dispatcher 20 checks whether there are work tasks that need to be processed. A complex workflow typically involves a plurality of such work tasks. If no work process 22 is available for processing a received work task, the work task is kept together with other tasks in the dispatcher queues 26 until a work process 22 becomes available.

Once a work process 22 becomes available, the dispatcher 20 sends the user data to the available work process 22. A work process 22 is a program in charge of executing the application tasks of the present invention. Each work process 22 acts as a specialized system service. From the point of view of an operating system, a group of parallel work process 22 as depicted in FIG. 2 makes up a runtime system. Each individual work process 22 includes a task handler, a processor, and a database interface (not shown).

The work process 22 may execute dialogue steps for the presentation server 14. These steps generally relate to the processing or display of a single GUI screen, which means that right after one work process 22 finishes the execution of a dialogue step for a user session, it is immediately available for use by another user session. For its processing, each dialogue step needs code, dictionary objects, and data. These elements may come from the database residing on the database servers 10 or from an internal memory of the application server 12. Within a dialogue step, a task handler (not shown) is in charge of assigning the corresponding tasks to the internal components (dialogue interpreter and processor), finally sending a SQL request to the database servers 10. The database servers 10 send the requested data back to the requesting work process 22, which in turn process it and passes it via the dispatcher 20 to the presentation server 14. The GUI on the presentation server 14 formats the requested data and builds up the screen for the user.

If during a particular work process 22 application data has to be exchanged with other applications such as legacy applications or external applications, the functionality of the gateway 24 is activated.

The ICM 30 allows the direct processing of HTTP requests coming from the Internet and/or a browser running on a presentation server 14, and for sending HTTP requests as HTTP client requests to the Internet. The ICM 30, which may be configured as a dedicated kernel process, uses threads to communicate as a server or as a client on the Internet. If a work process 22 processes an HTTP request, the memory pipes 28 are used for data transfer. The memory pipes 28 are located in a shared memory portion. In its Web client position a work process 22 creates an HTTP request, which is sent to a Web server. It then receives the HTTP response and the work process 22 proceeds on the basis of the HTTP response.

The application running on the application server 12 of FIG. 2 is configured to process hierarchically related application data in a path optimization context. The source code of the application can be written in various programming languages. In the following it is assumed that the application is written in an object-oriented programming language such as Java, C++ or ABAP OO (object-oriented Advanced Business Application Programming Language). Using such object-oriented programming languages, states, transitions, constraints, etc. can be defined as application classes (that may be derived from appropriate base classes). The application instantiates application objects from the classes during runtime.

The particular application entities described hereinafter are thus objects instantiated from associated classes. For the sake of simplicity, however, the application entities will simply be referred to by common names such as location (instead of location object instantiated from a subclass location of a base class geographical object), zone (instead of zone object instantiated from a subclass zone of a base class geographical object), and so on.

In the following, various further details concerning the implementation of the invention will be described. In order to facilitate a better understanding of the invention, the basic terminology used hereinafter will be defined first. References to the data model generally refer to database-related aspects, whereas references to the application model generally indicate that the application running on the application server 12 is involved.

In one embodiment, the data model defined in the database 10 includes the following master data:

1. a plurality of states $s_i$ and S being the set of states $s_i$ in the data model;
2. a sequence $l_1, \ldots, l_m$ of one or a plurality of levels, wherein $l_1$ is the lowest and $l_m$ is the highest level;
3. an assignment of each state $s_i$ to exactly one level in the data model, wherein $l(s_i)$ is the level of state $s_i$;
4. a hierarchy definition among the states $s_i$ in the data model, wherein to each state $s_i$ there are zero, one or a plurality of states of lower levels assigned, and wherein $\underline{S}(s_i)$ is the set of all states assigned to $s_i$, and $\overline{S}(s_i)$ is the set of all states to which $s_i$ is assigned;
5. a plurality of transition $a_h$ from one state $s_i$ to another state $s_j$, with $a_h \in A$ and A being the set of all transitions $a_h$ in the data model;
6. values for a plurality of dimensions $d_n$ in the data model with $d_n \in D$ and D being the set of all dimensions;

This data model provides for one or more given source states $S^S$ and for one or more given destination states $S^D$ an initial graph G=(V,E), with a vertex set $V = S \cup S^S \cup S^D$ and an edge set E comprising the transition set A plus edges derived from hierarchical relationships among the states $s_i$. For $s \in S^S \cup S^D$ there may exist at least one state s' in S with either s=s' or $s \in \underline{S}(s')$. A function $\sigma: A \rightarrow S \times S$, $\sigma(a) = (s_i, s_j)$ defines the transition $\alpha$ as one of the possible transitions from state $s_i$ to state $s_j$.

The edge set E will now be explained in more detail with reference to FIGS. 3 and 4.

Figure 3:
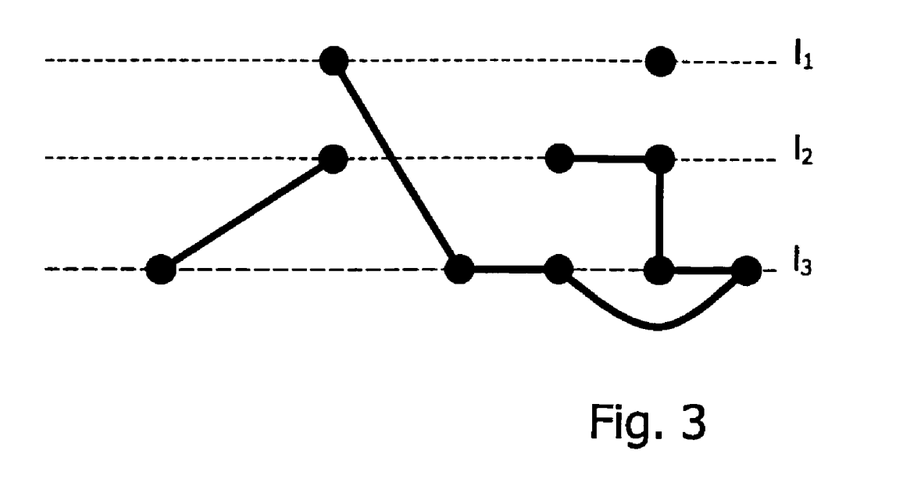
FIG. 3 is a schematic diagram illustrating transitions between individual hierarchy states.
Figure 4:
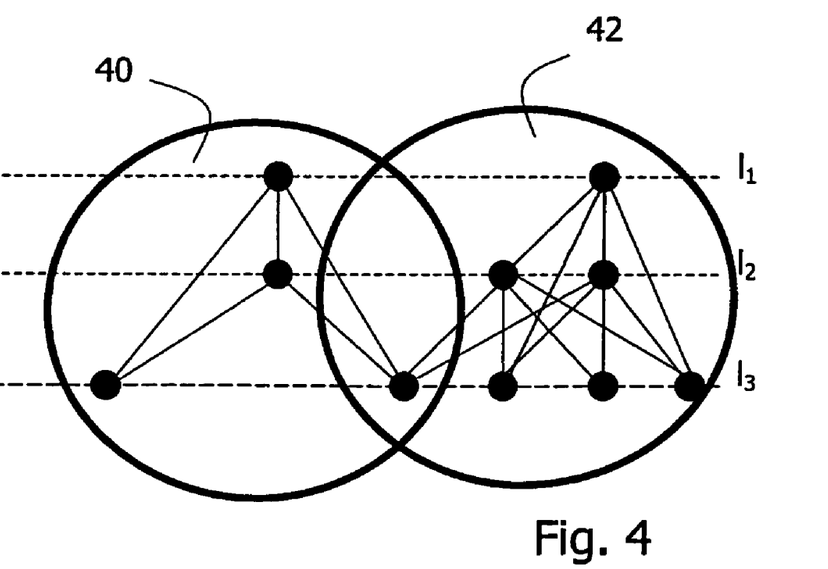
FIG. 4 is a schematic diagram illustrating hierarchical relationships among individual hierarchy states.

FIGS. 3 and 4 show an exemplary hierarchy scheme including a sequence of three hierarchy levels $l_1$ to $l_3$ (dashed lines). A plurality of states $s_i$ (black dots) is distributed over the hierarchy level such that each state $s_i$ is assigned to exactly one hierarchy level.

FIG. 3 shows a first subset of the edge set E, namely the edges resulting from the transitions $a_h$. The edges resulting from the transitions $a_h$ are shown as thick lines each connecting two individual states $s_i$.

FIG. 4 shows a second subset of the edge set E, namely the edges resulting from the hierarchical relationship among the states $s_i$. The hierarchical relationship results from that fact that to each state $s_i$ there are zero, one or a plurality of states of lower levels assigned. Two such assignments 40, 42 indicated as circles embracing hierarchically related states $s_i$ are shown. The edges resulting from the hierarchical relationship are shown as thin lines each connecting two individual states $s_i$.

A hierarchical relationship between two states may be defined in the data model either directly in the database or indirectly by defining conditions on state attributes in the database, which are applied by the application if required.

The data model that is provided allows (for some of the levels) the generation of a graph in the application model. Let $G_k = (V_k, E_k, C_k)$ be the graph of level $l_k$, wherein $V_k$ consists of at most those vertices in V assigned to the lowest k levels, and $E_k$ comprises edges linking vertices in $V_k$ which are derived from edges in E, and $c_k: E_k \rightarrow IR$ is a cost function indicative of dimensions in D. $E_k$ comprises all edges of $E_{k+1}$ with both vertices in $V_k$ plus the union of $\underline{e}_{k+1}$ for all other edges $e_{k+1}$ in $E_{k+1}$, where $e_{k+1}$ with $\theta(e_{k+1}) = (s_{k+1}, s'_{k+1})$ is a defined subset of $\{e=(s,s') | s^{()} = s_{k+1}^{()} \text{ vs}^{()} \in \underline{S}(s_{k+1}^{()})\}$. The graph $G_m$ of the highest level extends the initial graph G with the cost function $c_m: E_m \rightarrow IR$, and therefore the data model and the application model (the data model created by the application) coincide on this level.

On the application layer the edge set E of the initial graph G may be defined as the sum of the transition set A plus a subset of the hierarchy level ascending transitions $\overline{A} = \{(s_i, s_j) : s_j \in \overline{S}(s_i)\}$ plus a subset of the hierarchy level descending transitions $\underline{A} = \{(s_i, s_j) : s_j \in \underline{S}(s_i)\}$, resumed through the function $\theta: E \rightarrow V \times V$ with $\theta(\alpha) = \sigma(\alpha)$ for all actions $\alpha \in A$ and $\theta(s_i, s_j)$ for all $(s_i, s_j) \in \overline{A} + \underline{A}$ For each considered level $l_k$ a set $P_k$ of valid paths in the application graph $G_k$ is defined next. A path in $E_k$ is a connected sequence of edges in $E_k$ from $s_k^S \in V_k$ representing a source state in $S^S$ to $s_k^D \in V_k$ representing a destination state in $S^D$. For the source state $s_k^S$ of a valid path on level $l_k$ there exists at least one source state $s^S \in S^S$ with $s_k^{=sS}$ or $s_k^S \in \underline{S}(s^S)$, and similarly for its destination state. $\underline{S}(s)$ is the set of all states which are directly or indirectly assigned to s through the hierarchy. The valid path $p=(e^1, \ldots, e^r) \in P_{k+1}$ represents on the level $l_k$ a subset of $\underline{p}=\text{Paths}_k(p)$ of $\underline{e}'x \ldots x \underline{e}^r$.

Then, the method proceeds with determining for each heuristically selected valid path $p \in P_{k+1}$ the paths it represents in $P_k$. Subsequently for each considered optimization level $l_k$ from the highest down to the lowest $l_x$, the method determines the set $P_k^* \subseteq P_k$ of valid paths using a path optimization mechanism The solution paths are included in the set of determined paths of the final repetition.

In an further variation, that may be combined with the above approach, for each level a set of dimensions $D_k \subseteq D$ with $D_{k+1} \subseteq D_k$ for $k=1, \ldots, m-1$ is defined. For each edge $e_k$ in $E_k$ and for each dimension $d_n \in D_k$ a value $d_n(e_k)$ may be defined in the database or determined by the application. In this manner a particular "penalty" may be assigned to each edge. The penalty may for example define real-world parameters associated with the utilization of a network link $e_k$, the traveling time of goods or information along a lane $e_k$, and so on.

For each level $l_k$ an evaluation level $l_y$ with $1 \leq y \leq k$ is defined. The cost function $c_k$ is then indicative of the dimensions $D_y$ on its evaluation level $l_y$. More precisely, the cost value $c_k(p)$ of a valid path $p \in P_k$ can be defined as the average or minimum of the cost values $c_y(p')$ of all or just a sample of paths in $p' \in \text{Paths}_y(p)$.

Before illustrating several further embodiments of the invention (that can make use of the framework defined by the foregoing embodiments) in an exemplary transportation context, the terminology utilized hereinafter will be defined first.

1. A location n is a state on a first hierarchy level. The location is specified by a coordinate or by an unambiguous location identifier (such as an IP address or a global unique identifier GUID). When specifying a location within a coordinate system, a location can be written as a coordinate vector, e.g. as $n=(x_1, x_2)$ in the two-dimensional case with coordinates $x_1$ and $x_2$. The set of all locations is denoted by N. The location could represent a computer, a router, a network node in general, a city, a building, a customer site, a distribution center or a node in a pipeline system. The locations may have additional attributes like an address including an a ZIP code, etc.

2. A zone z is a state on a second hierarchy level above the first hierarchy level to which the locations are assigned. Consequently, each zone can comprise none, one or a plurality of locations. A zone z is specified by defining a coordinate space in a coordinate system or by an unambiguous zone identifier. The set of all zones is denoted by Z. A zone could represent a range of IP addresses, intervals of ZIP codes, etc.

There does not exist a hierarchy of zones, but already defined zones may be referenced when defining new zones. However, this reference to the already defined zone is no longer visible after definition of the new zone. In applications using ZIP codes for example, an already existing ZIP code rule can be combined with a new rule to define a new zone. A similar approach could be implemented for IP addresses, etc.

3. In the transportation context, spot is an abstraction of location and zone, and thus a synonym for (transportation) state.

4. In the transportation context, a stage is a link between a first spot and a second spot, and thus a synonym for transition. It represents the possibility to transport a tangible or intangible object from one spot to another.

5. In the transportation context each edge e is called a move.

6. A geographical object g is either a spot or a stage. The set of all geographical objects is called geography and is denoted by $G=(N,Z,E)$ with $G=S+E=N+Z+E$.

7. A pathfinder is a path optimization mechanism for finding shortest paths. The term "short" does not necessarily relate to distance, but may also relate to other aspects such as traveling time, consumption of resources, amount of intermediary hubs, etc. The following conventional optimization mechanisms could be used for implementing the present invention: Dijkstra-Algorithm for instance for instantaneously generated graphs, Best-First-Search for gradual generated graphs, etc.

Figure 5:
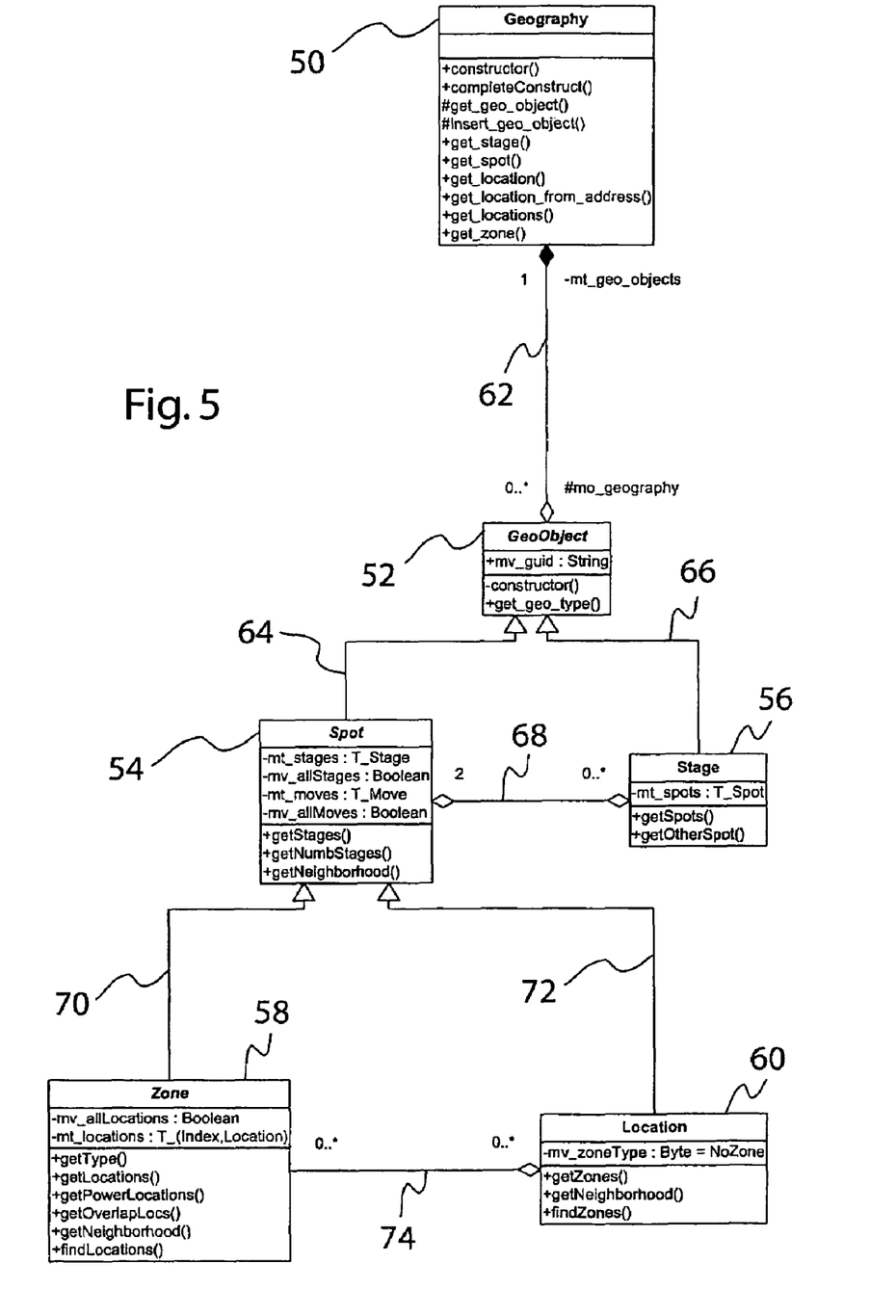
FIG. 5 is a first schematic UML diagram illustrating the geographical part of an object-oriented design of the transport model.

FIG. 5 shows a UML (Unified Modeling Language) diagram of a part of an object-oriented transportation model according to one embodiment of the invention. Standard UML labeling is used.

The Geography class 50 represents the manager of all geographical objects, which themselves are represented by the class GeoObject 52. The containment association 62 indicates that no GeoObject class instance can exists outside a Geography class instance. A containment association has a filled diamond end pointing to the part containing the whole.

The GeoObject class 52 is a base class for the classes Spot 54 and Stage 56. This means, that the latter classes are derived from the class GeoObject, and this way inherit attributes and methods defined in the base class. A generalization link has a triangle pointing to the base class.

Spot 54 itself is a base class for classes Zone 58 and Location 60. In other words, the base class spot 54 can be interpreted as a common abstraction of the classes Zone 58 and Location 60. This abstraction is already used for the data model for the definition of stage data, and allows that definitions on the database tier and the application tier go more along with each other.

The stage class 56 represents a connection between spots, which themselves are represented by the Spot class 54. The aggregation association 68 indicates that a Stage class instance refers to exactly two Spot class instances, but does not contain them as defined above. The aggregation association 68 further indicates that zero, one or a plurality of Stage class instances may reference the same Spot class instance. An aggregation has a diamond end pointing to the part containing the whole. Further, the association 74 indicates both that an instance of the Zone class 58 refers to zero, one, or a plurality of instances of the Location class 60, and vice versa.

Figure 6:
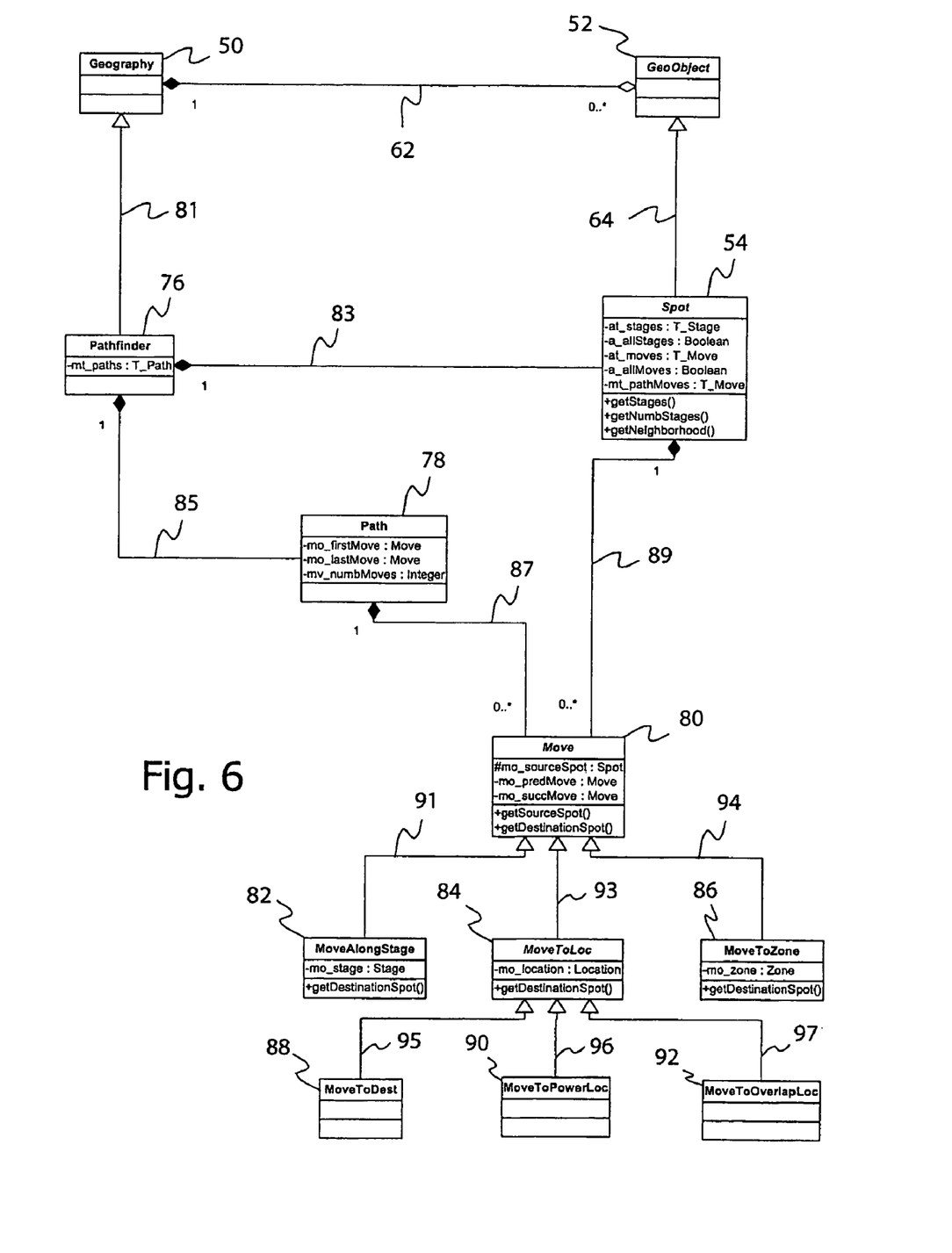
FIG. 6 is a second schematic UML diagram illustrating a part of an object-oriented design of the path optimization mechanism.

FIG. 6 shows a UML diagram of a part of an object-oriented design of the path optimization mechanism according to the present embodiment.

The Geography class 50 is linked with the GeoObject class 52 via the containment association 62. The GeoObject 52 is in turn linked with the spot class 54 via generalization link 64. Geography 50 is in this embodiment designed as the base class for the pathfinder class 76, as denoted by generalization link 81. For this, the Pathfinder class 76 has a containment association to the Spot class 54 like the Geography class 50 has to the GeoObject class 52. The pathfinder class 76 provides, inter alia, the algorithmic functionalities defining the particular repetitively applied path optimization mechanism. It further manages in this embodiment all paths, what is indicated by the containment association 85.

A path is a sequence of connected moves. During path object construction move objects are explicitly constructed in this embodiment. Consequently, these move objects do not exist outside of their path object. The containment association 87 indicates these characteristics. Likewise, there are in this embodiment move objects explicitly created for spot objects to indicate possible transitions to neighboring states. Again, the containment association 89 indicates these characteristics. The move class 80 is a base class for classes MoveAlongStage 82, MoveToLoc 84, and MoveToZone 86, as denoted by generalization links 91, 93, and 94 respectively. The MoveToLoc class 84 is a base class for classes MoveToDest 88, MoveToPowerLoc 90, and MoveToOverlapLoc 92, as denoted by generalization links 95, 96, and 97 respectively. A power location is a synonym for a location with at least one stage in the database.

As will be described below in more detail, a graph structure can be defined across both levels using the abstractions spot and move. This corresponds to the initial graph G=(V,E), where the vertices are the spots and the edges are the moves. On the aggregated level transportation optimizations can be performed quickly and efficiently (as only few spots are involved). According to the approaches defined by the foregoing embodiments, individual parts of a (coarsely) optimized transportation path or the whole (coarsely) optimized transportation path may repetitively be optimized on an increasingly detailed hierarchy level.

Figure 7:
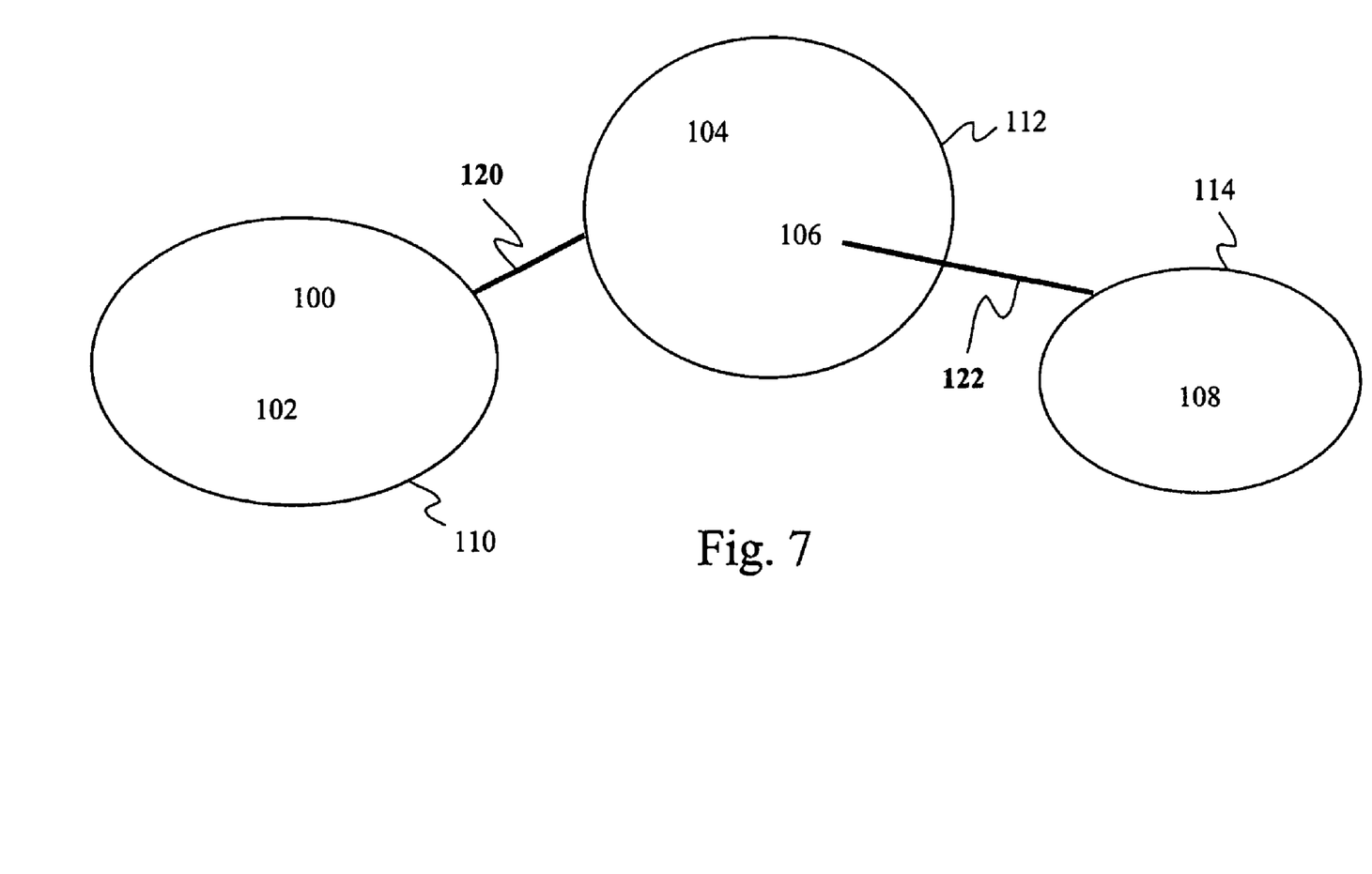
FIG. 7 is a schematic diagram illustrating an exemplary graph structure on a coarse level.

FIG. 7 shows an example for a physical arrangement of several zones (spots) 110, 112, 114 and locations (spots) 100, 102, 104, 106, 108 hierarchically related to the zones 110, 112, 114. Locations 100, 102 are located within zone 110, locations 104, 106 are located within zone 112 and location 108 is located within zone 114, giving rise to hierarchical relationships (moves) between locations 100, 102 and zone 110, between location 104, 106 and zone 112 as well as between location 106 and zone 114. Further, the stage (move) 120 is connecting zone 110 with zone 112 and stage (move) 122 is connecting location 106 with zone 114. The initial graph G=(V,E) in this example has the above mentioned spots as vertices and the above mentioned moves as edges.

Figure 8:
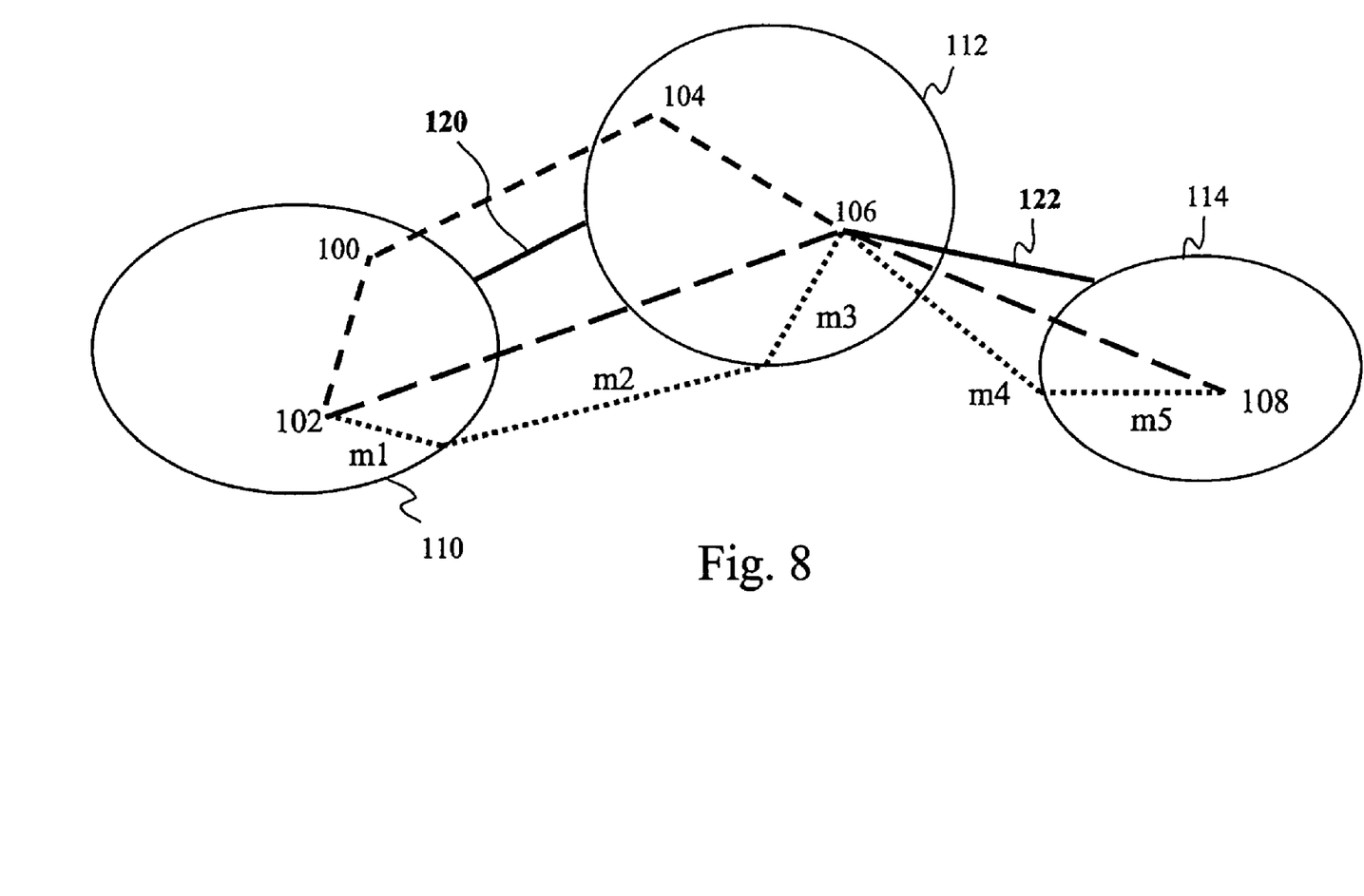
FIG. 8 is a schematic diagram illustrating the exemplary graph structure of FIG. 7 with related paths on different levels.

FIG. 8 shows the example of FIG. 7 with one dotted path on the aggregated level including spots in form of locations and zones. It further shows two paths (dashed line) on the detailed level including spots in form of locations only. The dashed paths in this example are generated from the dotted path after the optimization level has been decreased. The paths on either level begin at the source spot 102 and end at the destination spot 108. The dotted paths consists of the connected moves m1, m2, m3, m4, m5, whereby m1 is an object of the class MoveToZone, m2 and m4 are objects of the class MoveAlongStage, m3 is an object of the class MoveToPowerLoc, and finally m5 is an object of the class MoveToDest. The dashed paths follow the dotted path on location level involving different locations.

In detail: for the transport of information or of goods from location 102 to the next location 106, there now are several possible paths. One transport possibility is from location 102 to location 100 within zone 110, then from location 100 to location 104 within zone 112 and finally from location 104 to location 106 within zone 112. Another transport possibility is directly from location 102 within zone 110 to location 106 within zone 112. For further transportation from location 106 in zone 112 to location 108 within zone 114, there exists only one possibility, namely from location 106 in zone 112 to location 108 in zone 114 directly.

In one embodiment, locations 100, 102, 104, 106, and 108 could be geographical locations and the zones 110, 112, and 114 could be geographical regions. The transport order could be e.g. to transport goods from location Chicago 102 in zone USA 110 via airway 120 directly to location Munich 106 in West-Europe 112 to the final destination Budapest 108 in East-Europe 114 via road connection 122. In another embodiment, locations 100, 102, 104, 106, and 108 could be individual computers, e.g. identified by IP addresses, and lanes 120, 122 could be network connections between the computers.

In many cases it is not even necessary to build the whole graph, for example when it is determined that the path optimization mechanism need to be applied only to a partial graph.

As has become apparent from the description of preferred embodiments, the path finding approach according to the present invention is very flexible as the path optimization mechanism may not only consider paths within one hierarchy level but may leave a particular hierarchy level if it appears to be promising. The path optimization mechanism may thus calculate one or more paths that stretch over more than one hierarchy level. This additional degree of freedom leads to a faster determination of solution paths and thus saves processing resources.

As on a higher hierarchy level the most promising paths may heuristically be selected, and only the selected paths may be considered further during the next repetition (that may be performed on a lower hierarchy level). The overall amount of calculations that need to be performed for finding one or more solution paths on a given (often the lowest) level can be reduced further.

As the data entities processed, inter alia, by the path optimization mechanism on the aggregated level are already properly defined in the data model, the gap between the database tier and the application tier is reduced.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed:

1. A method for determining one or more solution paths between two states using a hierarchy graph that defines a sequence of hierarchy levels, comprising:
   providing a data model of master data including
      a state set with a plurality of states pertaining to physical sites, conditions of a physical entity, or the like, wherein each state is assigned to exactly one hierarchy level and wherein to each state zero, one or a plurality of states of lower hierarchy levels are assigned; and
      a transition set with transitions from one state to a state on the same or on a different hierarchy level;
   for at least one given source state and at least one given destination state, repeatedly performing the following steps:
      generating a graph having a plurality of states as vertices, transitions and hierarchical relationships among states as edges, and a cost function; and
      subjecting the graph to a path optimization mechanism outputting multiple paths from the at least one source state to the at least one destination state that heuristically influence the generation of the succeeding graph;
   wherein the one or more solution paths are included in the paths generated during the last repetition.

2. The method of claim 1, wherein the number of paths computed by the path optimization mechanism on each considered level is controlled by at least one of the optimization time and the number of paths found.

3. The method of claim 1, wherein a hierarchical relationship between two states is defined directly in the data model.

4. The method of claim 1, wherein a hierarchical relationship between two states is defined indirectly through conditions on state attributes.

5. The method of claim 1, wherein to each generated graph one level of the sequence of hierarchy levels is assigned.

6. The method of claim 5, wherein the levels assigned to the repeatedly generated graphs are strictly descending in the sense that the corresponding sequence lead from a highest level to a lowest level.

7. The method of claim 5, wherein the vertex set of each graph generated during the repetitions includes only states having a level less or equal to the level assigned to the respective graph.

8. The method of claim 5, wherein the edge set of each graph generated during the repetitions includes a subset of the transitions and hierarchical relationships between its vertices.

9. The method of claim 1, wherein an edge sequence is a path in one of the repeatedly generated graphs if all edges are in the edge set of this graph and if for each edge having a successor in the sequence its end and the start of its successor coincide, and wherein a valid path in this graph starts at the at least one source state and ends at the at least one destination state.

10. The method of claim 1, wherein from an edge in one of the repeatedly generated graphs a set of edges in the graph generated during the next repetition is generated using the hierarchical relationships of its states.

11. The method of claim 10, wherein from a path in one of the repeatedly generated graphs a set of paths in the graph generated during the next repetition is generated using the generated edge sets of its edges.

12. The method of claim 1, wherein the cost function of one of the repeatedly generated graphs evaluates a path in this graph based on costs associated with the edges of this graph.

13. The method of claim 1, wherein the cost function of one of the repeatedly generated graphs evaluates a path based on the evaluated costs of paths in its generated set of paths.

14. The method of claim 1, further comprising controlling transportation of tangible or intangible objects via a selected one of the solution paths.

15. The method of claim 1, wherein the master data further include at least one dimension set including a plurality of dimensions and wherein the cost function is indicative of dimensions in the dimension set.

16. The method of claim 15, wherein the dimensions include one or more of the following parameters: transportation duration, transportation capacity, transportation distance, changes of transportation means or transportation service provider.

17. The method of claim 1, wherein the transitions between two states include transportation means information and wherein different types of transportation means are associated with different transition types.

18. The method of claim 1, wherein the states include location objects on a first hierarchy level and zone objects on a second hierarchy level above the first hierarchy level, wherein each to each zone object zero, one or more location objects are assigned, and the transitions include connections between a location or zone and a location or zone.

19. The method of claim 1, further comprising the step of providing a set of heuristic rules for permitting an automatic selection of output paths.

20. A computer program product for causing a computer to perform a method for determining one or more solution paths between two states using a hierarchy graph that defines a sequence of hierarchy levels for flexibly storing and accessing hierarchical application data, the method comprising:
providing a data model of master data including
a state set with a plurality of states pertaining to physical sites, conditions of a physical entity, or the like, wherein each state is assigned to exactly one hierarchy level and wherein to each state zero, one or a plurality of states of lower hierarchy levels are assigned; and
a transition set with transitions from one state to a state on the same or on a different hierarchy level;
for at least one given source state and at least one given destination state, repeatedly performing the following steps:
generating a graph having a plurality of states as vertices, transitions and hierarchical relationships among states as edges, and a cost function; and
subjecting the graph to a path optimization mechanism outputting multiple paths from the at least one source state to the at least one destination state that heuristically influence the generation of the succeeding graph;
wherein the one or more solution paths are included in the paths generated during the last repetition.

21. The computer program product of claim 20, stored on a computer-readable recording medium.

22. A computer system for determining one or more solution paths between two states using a hierarchy graph that defines a sequence of hierarchy levels, comprising:
a database providing a data model of master data including
a state set with a plurality of states pertaining to physical sites, conditions of a physical entity, or the like, wherein each state is assigned to exactly one hierarchy level and wherein to each state zero, one or a plurality of states of lower hierarchy levels are assigned; and
a transition set with transitions from one state to a state on the same or on a different hierarchy level;
a processor which for at least one given source state and at least one given destination state repeatedly:
generates a graph having a plurality of states as vertices, transitions and hierarchical relationships among states as edges, and a cost function; and
subjects the graph to a path optimization mechanism outputting multiple paths from the at least one source state to the at least one destination state that heuristically influence the generation of the succeeding graph;
wherein the one or more solution paths are included in the paths generated during the last repetition.

* * * * *